(12) United States Patent
Zook et al.

(10) Patent No.: US 6,486,269 B2
(45) Date of Patent: Nov. 26, 2002

(54) CURABLE POLYTHIOL-CYCLOPOLYENE SEALANT COMPOUNDS

(75) Inventors: Jonathan D. Zook, Santa Clarita, CA (US); David W. Jordan, Northridge, CA (US); Dean M. Willard, New York, NY (US); George Jones, Tustin, CA (US); Michael Cosman, Irvine, CA (US)

(73) Assignee: PBT Brands, Inc., Santa Clarita, CA (US)

( * ) Notice: Subject to any disclaimer, the term of this patent is extended or adjusted under 35 U.S.C. 154(b) by 0 days.

(21) Appl. No.: 09/802,378

(22) Filed: Mar. 9, 2001

(65) Prior Publication Data

US 2002/0016439 A1 Feb. 7, 2002

(Under 37 CFR 1.47)

Related U.S. Application Data

(60) Provisional application No. 60/188,107, filed on Mar. 9, 2000.

(51) Int. Cl.$^7$ .................. C08F 283/00; C08G 75/00; C08L 81/00
(52) U.S. Cl. .................. 525/535; 528/373; 528/374; 528/376
(58) Field of Search .................. 525/535; 528/373, 528/374, 376

(56) References Cited

U.S. PATENT DOCUMENTS

| | | | |
|---|---|---|---|
| 3,650,802 A | 3/1972 | Kehr et al. ............... 117/47 R |
| 3,699,084 A | 10/1972 | Kehr et al. ............... 260/858 |
| 3,843,572 A | 10/1974 | Morgan .................. 260/17 R |
| 3,966,794 A | 6/1976 | Larsen ................... 260/471 C |
| 3,976,553 A | 8/1976 | Larsen ................... 204/159.22 |
| 4,045,317 A | 8/1977 | Larsen ................... 204/159.23 |
| 4,056,548 A | 11/1977 | Larsen ................... 260/455 R |
| 4,104,283 A | 8/1978 | Hickner .................. 260/348.43 |
| 4,150,166 A | 4/1979 | Mathias et al. ............. 427/44 |
| 4,230,740 A | 10/1980 | Moyer .................... 427/54.1 |
| 4,272,586 A | 6/1981 | Ando et al. ............... 428/419 |
| 4,366,307 A | 12/1982 | Singh et al. .............. 528/373 |
| 4,609,762 A | 9/1986 | Morris et al. ............. 568/38 |
| 4,808,638 A | 2/1989 | Steinkraus et al. ........... 522/24 |
| 5,225,472 A | 7/1993 | Cameron et al. ........... 524/368 |
| 5,358,976 A | 10/1994 | Dowling et al. ............ 522/18 |
| 5,371,181 A | 12/1994 | Glaser et al. .............. 528/376 |
| 5,912,319 A | 6/1999 | Zook et al. ............... 528/373 |
| 5,959,071 A | 9/1999 | DeMoss et al. ............ 528/378 |
| 6,172,179 B1 | 1/2001 | Zook et al. ............... 528/373 |
| 6,232,401 B1 | 5/2001 | Zook et al. ............... 525/191 |

OTHER PUBLICATIONS

Jacobine et al. "Norbornene resins as substrate in thiol–ene polymerizations" Spec. Publ.–R. Soc. Chem. (1991), 89 (Radiat. Curing Polym. 2), 342–57.

Jacobine et al. "Photocrosslinking of norbornene resins with multifunctional thiols" Polym. Mater. Sci. Eng. (1989), 60, 211–16.

*Primary Examiner*—Duc Truong
(74) *Attorney, Agent, or Firm*—Gifford, Krass, Groh, Sprinkle, Anderson & Citkowski, P.C.

(57) ABSTRACT

A curable sealant compound comprising: a polythiol; a cyclopolyene having a formula:

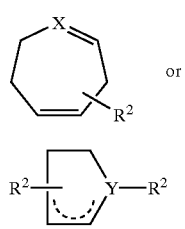

where X is $C_{1-5}$ aliphatic, Y is a $C_{1-6}$ aliphatic, $R^2$ is in each occurrence H, $C_1$–$C_{10}$ alkyl, $C_2$–$C_{10}$ alkenyl,

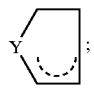

Q—$R^3$ where Q is O or S and $R^3$ is $C_{2-10}$ alkenyl, such that the cyclopolyene has non-conjugated carbon—carbon unsaturated bonds, and in formula (VII) there is one non-conjugated carbon—carbon unsaturated bond within the ring that is non-conjugated to other carbon—carbon unsaturated bonds; and an effective amount of a free radical catalyst.

22 Claims, No Drawings

CURABLE POLYTHIOL-CYCLOPOLYENE SEALANT COMPOUNDS

RELATED APPLICATION

This application claims priority of United States Provisional Patent Application No. 60/188,107 filed Mar. 9, 2000, and is incorporated herein by reference.

FIELD OF THE INVENTION

The present invention relates generally to polythioethers and, more particularly, to polythioethers formed by addition of a polythiol and a cyclopolyene.

BACKGROUND OF THE INVENTION

Thiol-terminated sulfur-containing polymers have a long history of use in aerospace sealants because of their fuel resistant nature upon cross-linking. Among the commercially available polymeric compounds having sufficient sulfur content to exhibit this desirable property are the polysulfide polymers described, e.g., in U.S. Pat. No. 2,466,963 and sold under the trade name LP® polysulfide by Morton International of Chicago, Ill. and the alkyl side chain containing polythioether polymers described, e.g., in U.S. Pat. No. 4,366,307 that are sold in complete sealant formulations by PRC-DeSoto International, Inc. of Glendale, Calif. In addition to fuel resistance, polymers useful in this context must also have the desirable properties of low temperature flexibility, liquidity at room temperature, high temperature resistance, a reasonable cost of manufacture, and not be so malodorous as to prevent commercial acceptance of compositions that contain the subject polymers.

U.S. Pat. No. 4,366,307 teaches the use of hydroxyl-functional thioethers having pendent alkylene groups to obtain polymers having good flexibility and liquidity. However, the disclosed condensation reaction has a maximum yield of about 75% of the desired condensation product. Furthermore, the acid-catalyzed reaction of beta-hydroxysulfide monomers, such as thiodiglycol, yields significant quantities (typically not less than about 25%) of an aqueous solution of thermally stable and highly malodorous cyclic byproducts, such as 1-thia-4-oxa-cyclohexane. As a result, the commercial viability of the disclosed polymers is limited. Further, pendent alkylene chains increase the carbon content of the polymer necessitating a high sulfur content to achieve sufficient chemical resistance properties.

U.S. Pat. No. 5,959,071 teaches the use of pendant alkylene chains and high sulfur content to achieve the chemical resistance and room temperature liquidity required for aerospace sealant formulations.

Certain prior art work has developed hydroxyl-terminated polythioethers by condensing thiodiglycol in the presence of certain etherifying catalysts as, for example, shown in U.S. Pat. Nos. 3,312,743 and 3,335,189. Compounds produced by these patents give semi-crystalline waxy solids, gums or low molecular weight liquids that have limited commercial utility.

Another desirable feature in polymers suitable for use in aerospace sealants is high temperature resistance. Inclusion of covalently-bonded sulfur atoms in organic polymers has been shown to enhance high temperature performance. However, in the polysulfide polymers disclosed in U.S. Pat. No. 2,466,963, the multiple —S—S—linkages in the polymer backbones result in compromised thermal resistance. In the polymers disclosed in U.S. Pat. No. 5 4,366,307, enhanced thermal stability is achieved through replacement of polysulfide linkages with polythioether (—S—) linkages. In practice, however, the disclosed materials have compromised thermal resistance due to traces of the residual acid condensation catalyst.

U.S. Pat. No. 5,912,319 teaches the use of combinations of certain polythiols with oxygenated dienes resulting in polythioether polymers that are liquids at room temperature and pressure and have desirable physical properties. Further, these combinations are substantially free of residual catalysts and malodorous cyclic byproducts. Unfortunately, the oxygenated dienes described are very difficult to prepare and only a limited number of commercial compounds are known to exist.

In addition to the foregoing deficiencies with the previously known polythioethers, the prior art polythioethers are typically also crystallizing products which, even if liquid or semi-liquid at ambient temperatures, when cooled sufficiently to solidify will not return to their previous liquid state even when the temperature is raised to ambient.

SUMMARY OF THE INVENTION

A curable sealant compound comprising: a polythiol, a cyclopolyene having a formula:

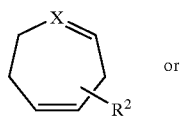

(I)

or

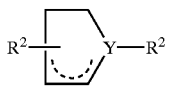

(II)

where X is $C_{1-5}$ aliphatic, Y is a $C_{1-6}$ aliphatic, $R^2$ is in each occurrence H, C–$C_{10}$ alkyl, $C_2$–$C_{10}$ alkenyl,

 and

Q—$R^3$ where Q is O or S and $R^3$ is $C_{2-10}$ alkenyl, such that the cyclopolyene has non-conjugated carbon—carbon unsaturated bonds, and in formula (VII) there is one carbon—carbon unsaturated bond within the ring that is non-conjugated to other carbon—carbon unsaturated bonds; and an effective amount of a free radical catalyst.

A process for forming a polythioether includes the step of mixing a polythiol and an inventive cyclopolyene as detailed above in the presence of an effective amount of a catalyst promoting addition therebetween. A sealant formed by curing such a polythioether in the presence of a filler and a curing agent is also contemplated.

DETAILED DESCRIPTION OF THE INVENTION

The present invention includes a polythioether polymer made by the reaction of a thiol (dithiol) and an aliphatic, ring-containing non-conjugated diene in the presence of a catalyst. The reaction is generally represented as follows:

(III)

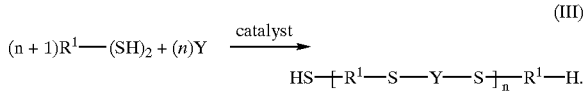

In this reaction, "n" is an integer such that the desired molecular weight is obtained, typically 1000–10,000 Daltons. Preferably, a curable polythioether according to the present invention is a liquid at room temperature to facilitate substrate application.

Polythiols operative in the present invention illustratively include

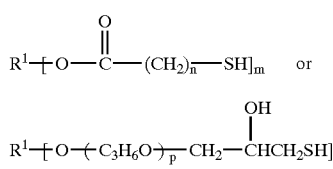

where $R^1$ is a linear or branched alkyl $C_1$–$C_{20}$, or a $C_6$–$C_8$ aryl, $R^1$ lacking groups reactive under addition reaction conditions with an unsaturated carbon—carbon bond; m is an integer of 2 to 6, inclusive; n and p are each independently integers of 0 to 3, inclusive; and Q is a heteroatom of either S or O in each occurrence. Preferably, m is a mixture of integer values to result in an average polythioether functionality of greater than 2. More preferably, the average functionality is less than 3. Still more preferably, the average polythioether functionality is about 2.01 to 2.10. Preferably, a polythiol has a molecular weight of more than 70 and less than 500 Daltons.

Y in equation (III) is an aliphatic ring containing non-conjugated polyene with at least one carbon—carbon unsaturated bond with the ring. A compound Y is defined herein to be a cyclopolyene. A cyclopolyene operable herein illustratively includes

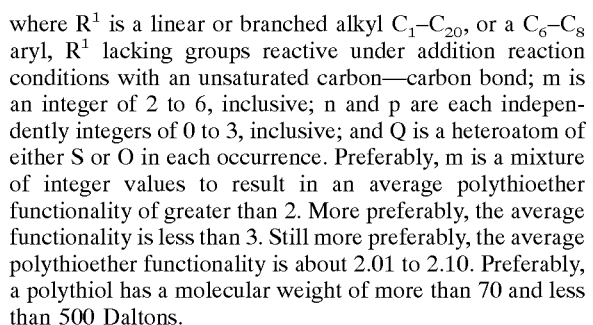

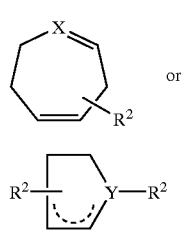

where X is $C_{1-5}$ aliphatic, Y is $C_{1-6}$ aliphatic, $R^2$ is in each occurrence H, $C_1$–$C_{10}$ alkyl, $C_2$–$C_{10}$ alkenyl,

Q—$R^3$ where Q is O or S and $R^3$ is $C_{2-10}$ alkenyl, such that the cyclopolyene has non-conjugated carbon—carbon unsaturated bonds, and in formula (VII) there is one non-conjugated carbon—carbon unsaturated bond within the ring that is non-conjugated to other carbon—carbon unsaturated bonds. Preferably, a cyclopolyene is an unconjugated cyclodiene or a cycloalkene having an unconjugated double bond containing substituent. More preferably, a cyclopolyene is a 5, 6, 8 or 12 member ring or dimer of two such rings. It is appreciated that the functionality of an inventive polythioether can likewise be increased beyond two per polymer chain as detailed with regard to the polythiol compound hereof by the addition of some amount of a cyclopolyene having three or more non-conjugated unsaturated carbon—carbon bonds per molecule.

Suitable thiols include lower alkylene thiols such as ethanedithiol, vinylcyclohexyldithiol, dicyclopentadienedithiol, dipentene dimercaptan, and hexanedithiol; aryl thiols such as benzene dithiol; polyol esters of thioglycolic acid and thiopropionic acid. Preferred thiol components contain heteroatoms with examples being dimercaptodiethyl sulfide (DMDS) with a group of $R^1$ of $HSCH_2CH_2SCH_2CH_2SH$ and dimercaptodioxaoctane (DMDO) with a group $R^1$ of $HSCH_2OCH_2OCH_2CH_2SH$.

Suitable cyclodienes illustratively include vinylcyclohexene, dipentene, dicyclopentadiene, cyclododecadiene, cyclooctadiene, 2-cyclopenten-1-ylether, s-vinyl-2-norborene and norbornadiene. One preferred diene is vinylcyclohexene. A preferred cyclotriene is cyclododecatriene.

Suitable catalysts for the reaction of the polythiol and the cyclopolyene include any of a number of azo or peroxide free radical initiators such as the azobisalkalenenitrile sold by DuPont under the trade name VAZO™. Most preferred is VAZO 67™ because of the desirable activation temperature and its low level of residual odor.

In aerospace sealants, it is desirable to use polymers that have greater than two reactive terminals per polymer molecule. In practice, adding small quantities of either a polythiol or a polyene increases the functionality of these materials. As polythiols are often more expensive than cyclopolyenes, generally cyclopolyenes are chosen to achieve this end.

In another embodiment, the inventive polythioether is a capped polymer in which the terminal-SH groups are replaced with alkyl or heteroatom subtituted alkyl substituents, where the heteroatom includes N, O, Si or S. Capping moieties are produced by the reaction of a terminal thiol with a monounsaturated compound such as, for example, vinyl pyridine, triethoxyvinylsilane and other compounds detailed in U.S. Pat. No. 5,912,319.

Table 1 illustrates the results of reacting various thiols (dithiols) and dienes in the presence of a suitable catalyst invention and are examples of the inventive compositions:

TABLE I

| | | | Polymer Properties | | | | | |
|---|---|---|---|---|---|---|---|---|
| Example | Thiol | Diene | % Yield* | Odor | Carbon % | Sulfur % | Oxygen % | Physical State |
| 1 | DMDS | Vinylcyclohexene, $C_8H_{12}$ | 99 | None | 55 | 37 | 0 | Liquid |
| 2 | DMDS | Dipentene, $C_{10}H_{16}$ | 99 | None | 58 | 33 | 0 | Liquid |
| 3 | DMDS | Dicyclopentadiene, $C_{10}H_{12}$ | 98 | V. Slight | 59 | 36 | 0 | Liquid |

TABLE I-continued

Polymer Properties

| Example | Thiol | Diene | % Yield* | Odor | Carbon % | Sulfur % | Oxygen % | Physical State |
|---------|-------|-------|----------|------|----------|----------|----------|----------------|
| 4 | DMDS | Cyclododecadiene, $C_{12}H_{20}$ | 95 | V. Slight | 60 | 30 | 0 | Liquid |
| 5 | DMDO | Vinylcyclohexene, $C_8H_{12}$ | 99 | None | 58 | 22 | 11 | Liquid |
| 6 | DMDO | Dipentene, $C_{10}H_{16}$ | 98 | None | 60 | 20 | 10 | Liquid |

*Expressed as percent of theoretical

Polythioethers according to the present invention have particular utility as aerospace sealants. The polymeric rigidity associated with the cyclopolyene ring structures and the ability to control the atomic ratio C:S:O affords high strength sealant formulations with desirable chemical resistance in aerospace environments. Typical atomic percent ratios for polythioethers according to the present invention are for C:S:O between 50–65:15–45:0–15. Preferably, the ratio is between 55–60:30–40:0. In specific chemical and thermal environments an alternative embodiment atomic percentage ratio of C:S:O is 55–60:15–25:5–15.

Inventive polythioethers are combined with curing agents and fillers to form curable sealant formulations. It is appreciated that optional additional additives include one or more pigments, thixotropes, accelerators, retardants, adhesion promoters and masking agents. Cure conditions and the identity of illustrative curing agents, fillers and additives are those conventional to the art as detailed in U.S. Pat. 5,912,913, column 12, line 3–column 13, line 14. Further, it is appreciated that lightweight fillers such as microspheres and amorphous materials as detailed in co-filed utility application entitled "High Strength Polymers and Aerospace Sealants Therefrom" are operative herein.

To further demonstrate the usefulness of the inventive compositions, the example polymers are formulated, cured, and tested according to industry standard protocols. In all cases, the following example formulation is used:

| Ingredient | Parts by Weight Used |
|------------|----------------------|
| Dow Epoxy Novolac 431 | 75 |
| Shell Epon 828 | 25 |
| Carbon black | 5 |

Table II summarizes the surprisingly improved performance obtained using the inventive compositions:

TABLE II

Formulated Sealant Properties

| Polymer | Shore A hardness | Peel strength before immersion, lbs/inch width | Peel strength after immersion, lbs/inch width | Adhesion to test panel before and after immersion | Tensile strength at break | Elongation at break |
|---------|------------------|------------------------------------------------|-----------------------------------------------|---------------------------------------------------|---------------------------|---------------------|
| Example 1 | 65 | 85 | 80 | 100%/100% | 625 | 400 |
| Example 2 | 63 | 80 | 72 | 100%/100% | 600 | 350 |
| Example 3 | 62 | 80 | 71 | 100%/100% | 610 | 375 |
| Example 4 | 60 | 75 | 50 | 100%/100% | 550 | 400 |
| Example 5 | 63 | 65 | 45 | 100%/100% | 550 | 400 |
| Example 6 | 60 | 60 | 35 | 100%/100% | 500 | 425 |
| Polymer from Example 16 of U.S. Pat. No. 4,366,307 | 45 | 35 | 20 | 100%/100% | 290 | 300 |
| Polymer from Example 16 of U.S. Pat. No. 4,366,307 | 52 | 50 | 35 | 100%/100% | 550 | 450 |

As Table I shows, using the reaction process of the invention, liquid polythioethers are produced without cyclized byproducts as indicated by the odor qualities thereof. Further, monomer blend ratios useful in the context of this invention are chosen such that the following composition is preserved: carbon content less than 60 percent by weight, most preferred less than 58 percent; sulfur content less than 22 percent by weight; and oxygen content less than 15 percent by weight.

In its most preferred embodiment, the polythioether polymer will have a reactive moiety at the terminal of each polymer chain. Preferred reactive moieties include —SH, —OH, NH2, epoxy, isocyanate, or any of a number of ambient temperature cross-linking chemistries. Preferred molecular weights range from 1000–10,000 Daltons with the most preferable range being 2000–6000.

All patents and publications disclosed herein are hereby incorporated by reference to the same extent as if each individual patent or publication was explicitly and individually incorporated herein by reference.

While the polythioethers and the process for formation thereof according to the present invention has been described in use primarily as an aerospace sealant, it is understood that the present invention also has utility in formulating molding compounds, potting compounds, sealing compounds for thermopane and windshield glasses and the like. Modifications to the identity and process of polythioether formation will be readily apparent to one skilled in the art upon reading the above specification without departing from the spirit thereof. It is intended that such modifications and all equivalents thereof fall within the scope of the appended claims.

What is claimed is:

1. A curable liquid polythioether component of sealant compound comprising:
   a polythiol;
   a cyclopolyene having a formula:

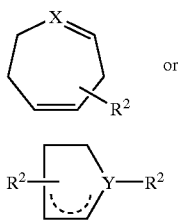

where X is $C_{1-5}$ aliphatic, Y is a $C_{1-6}$ aliphatic, $R^2$ is in each occurrence H, $C_1$–$C_{10}$ alkyl, $C_2$–$C_{10}$ alkenyl,

 and;

Q—$R^3$ where Q is O or S and $R^3$ is $C_{2-10}$ alkenyl such that the cyclopolyene has non-conjugated carbon—carbon unsaturated bonds, and in formula (II) there is one non-conjugated carbon—carbon unsaturated bond within the ring that is non-conjugated to other carbon—carbon unsaturated bonds; and
   an effective amount of a free radical catalyst.

2. The compound of claim 1 wherein said free radical catalyst is a peroxide or azonitrile.

3. The compound of claim 1 wherein said cyclopolyene is a diene.

4. The compound of claim 3 wherein said diene is selected from the group consisting of: vinylcyclohexene, dipentene, dicyclopentadiene, cyclododecadiene, cyclooctadiene, 2-cyclopenten-1-yl-ether, s-vinyl-2-norborene and norbomadiene.

5. The compound of claim 1 wherein said cyclopolyene is a triene.

6. The compound of claim 5 wherein said triene is cyclododecatriene.

7. The compound of claim 1 wherein said cyclopolyene is vinylcyclohexene.

8. The compound of claim 1 being a liquid at 20° C. and having a molecular weight of between 1000 and 10,000 Daltons.

9. The compound of claim 1 wherein said polythiol and said cyclopolyene are both devoid of oxygen.

10. The compound of claim 1 wherein the atomic percentage ratio of C:S:O is between 50–65:15–45:0–15.

11. The compound of claim 10 wherein said atomic percent ratio is 55–60:30–40:0.

12. The compound of claim 10 wherein said atomic percent ratio is 55–60:15–25:5–15.

13. The compound of claim 1 wherein said polythiol is present in a molar stoichiometric excess relative to said cyclopolyene to yield a thiol terminated compound.

14. The compound of claim 1 wherein said cyclopolyene is present in a molar stoichiometric excess relative to said polythiol to yield an ene terminated compound.

15. The compound of claim 1 having an average functionality of greater than 2.

16. A process of forming a polythioether comprising the steps of: mixing a polythiol and a cyclopolyene according to claim 1 in the presence of an effective amount of a catalyst promoting addition therebetween thereby forming said polythioether having terminal reactive groups.

17. The process of claim 16 further comprising the step of capping the tenninal reactive groups.

18. The process of claim 16 wherein said polythiol, said cyclopolyene and said catalyst are mixed under conditions to yield a liquid polythioether having a molecular weight of between 1000 and 10,000 Daltons.

19. The process of claim 16 wherein either said polythiol or said cyclopolyene has an average functionality of greater than 2.

20. The process of claim 16 wherein said cyclopolyene is selected from the group consisting of: vinylcyclohexene, dipentene, dicyclopentadiene, cyclododecadiene, cyclooctadiene, 2-cyclopenten-1-yl-ether, s-vinyl-2-norborene, norbomadiene and cyclododecatriene.

21. A sealant formed by curing a polythioether comprising: a compound according to claim 1, a filler and a curing agent.

22. The sealant of claim 21 further comprising at least one additive selected from the group consisting of: pigments, thixotropes, accelerators, retardants, adhesion promoters and masking agents.

* * * * *

UNITED STATES PATENT AND TRADEMARK OFFICE
CERTIFICATE OF CORRECTION

PATENT NO. : 6,486,269 B2
DATED : November 26, 2002
INVENTOR(S) : Zook et al.

It is certified that error appears in the above-identified patent and that said Letters Patent is hereby corrected as shown below:

Column 1,
Line 65, replace "54,366,307" with -- 4,366,307 --.

Column 2,
Line 35, replace "C-$C_{10}$" with -- $C_1$ - $C_{10}$ --.

Column 3,
Line 6, replace "$R^1$(SH)" with -- $R^1$( SH$)_m$ (IV) --.

Column 4,
Line 27, replace "norbomadiene" with -- norbornadiene --.
Line 33, replace "VAZOTM$^{TM}$" with -- VAZO$^{TM}$ --.

Column 7,
Line 1, replace "NH2" with -- $NH_2$ --.
Lines 31-34, replace "Y" with -- $Y_6$ --.

Column 8,
Lines 2-3, replace "norbomadiene" with -- norbornadiene --.
Line 36, replace "tenninal" with -- terminal --.
Line 48, replace "norbomadiene" with -- norbornadiene --.

Signed and Sealed this

Twenty-second Day of July, 2003

JAMES E. ROGAN
*Director of the United States Patent and Trademark Office*